C. FREDRICKSON.
CONVEYING APPARATUS.
APPLICATION FILED MAR. 13, 1920.
1,404,591.
Patented Jan. 24, 1922.
2 SHEETS—SHEET 1.
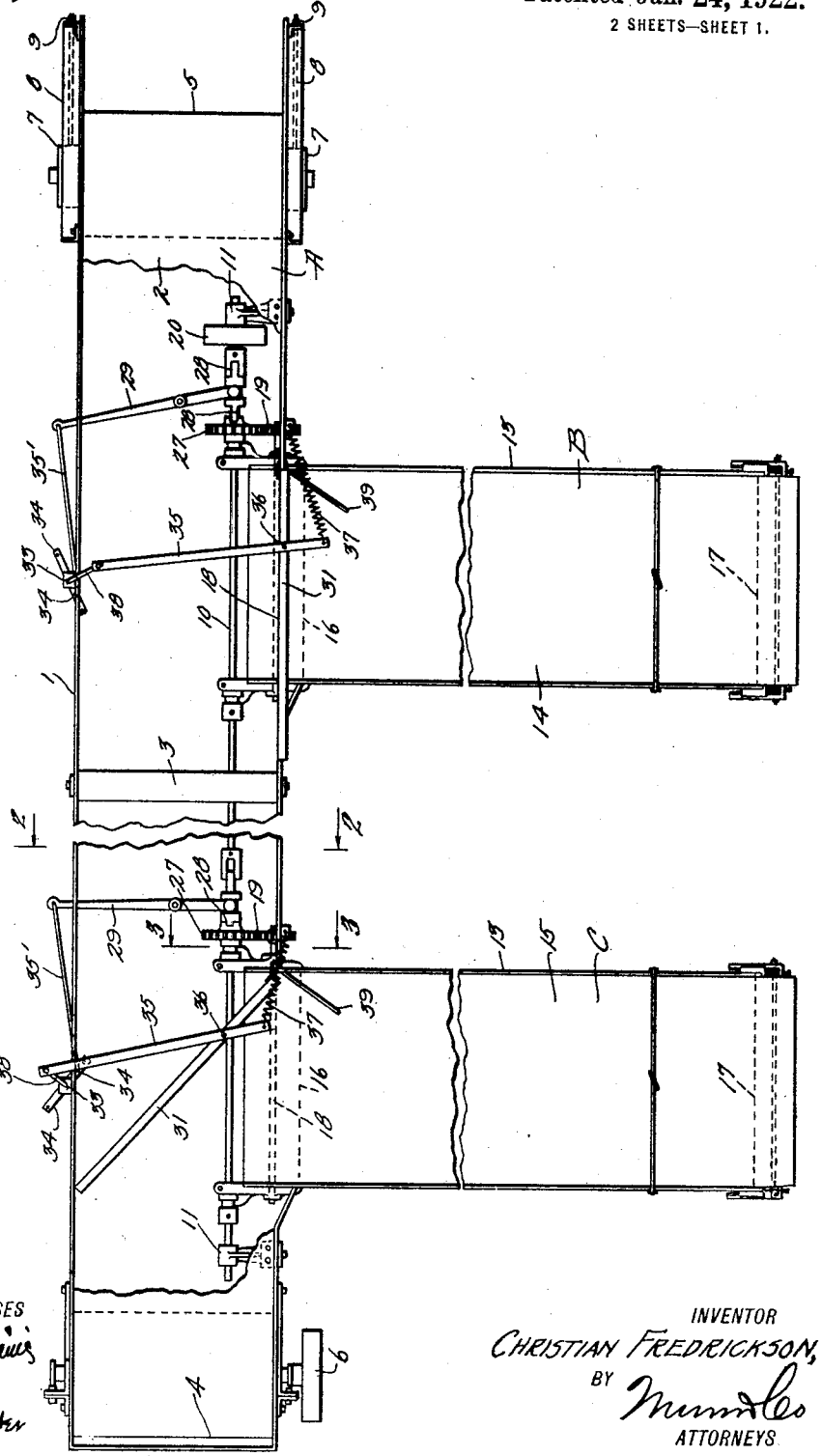
INVENTOR
CHRISTIAN FREDRICKSON,
BY
ATTORNEYS

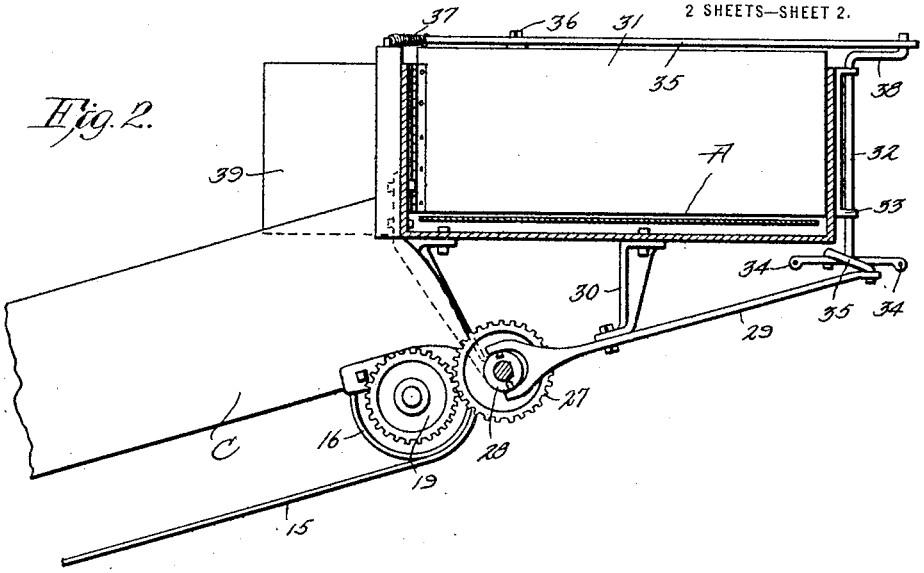
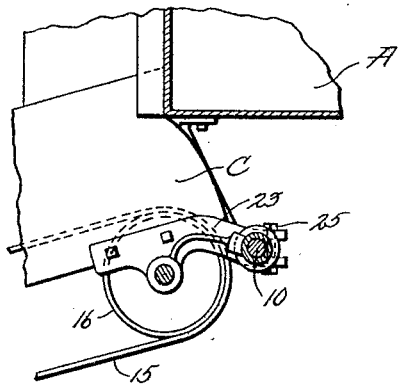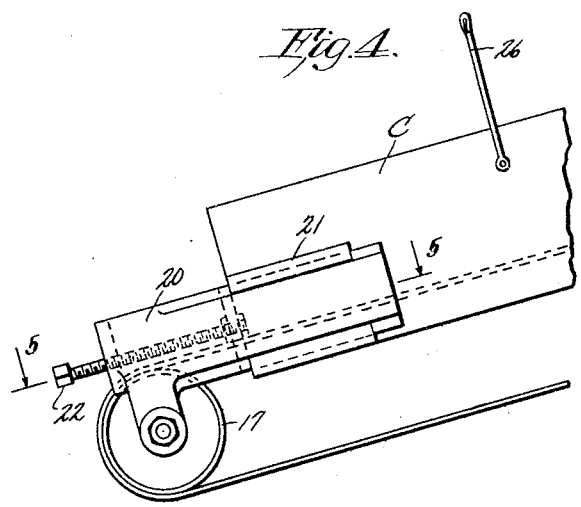
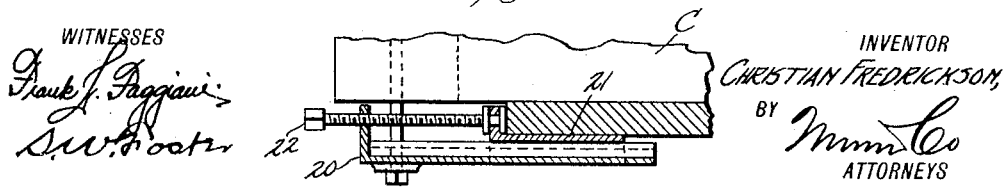

UNITED STATES PATENT OFFICE.

CHRISTIAN FREDRICKSON, OF RICE LAKE, WISCONSIN.

CONVEYING APPARATUS.

1,404,591.      Specification of Letters Patent.      Patented Jan. 24, 1922.

Application filed March 13, 1920. Serial No. 365,440.

*To all whom it may concern:*

Be it known that I, CHRISTIAN FREDRICKSON, a citizen of the United States, and a resident of the city of Rice Lake, in the county of Barron and State of Wisconsin, have invented a new and Improved Conveying Apparatus, of which the following is a full, clear, and exact description.

This invention relates to improvements in conveying apparatus, an object of the invention being to provide an apparatus which is especially adapted for the conveying of potatoes or other vegetables and fruit, which will quickly and conveniently handle the same without injury thereto.

Another object is to provide a main conveyer with cross conveyers removably connected thereto, and provide an improved arrangement of doors, controlling the passage of potatoes or other articles from the main conveyer onto any of the branch conveyers, and provide improved means connecting the doors with the clutches controlling the operation of the branch conveyers, so that the operation of the doors and clutches will be simultaneous.

With these and other objects in view, the invention consists in certain novel features of construction and combinations and arrangements of parts as will be more fully hereinafter pointed out and described in the claims.

In the accompanying drawings:

Figure 1 is a plan view partly broken away to illustrate parts below.

Figure 2 is an enlarged view in section on the line 2—2 of Figure 1.

Figure 3 is an enlarged view in section on the line 3—3 of Figure 1.

Figure 4 is a fragmentary view in side elevation of the outer end of a branch conveyer.

Figure 5 is a view in section on line 5—5 of Figure 4.

A represents the main conveyer and B and C the branch conveyers, and I would have it understood that while I have illustrated but two of the branch conveyers both on the same side of the main conveyer, that I may employ any desired number of such branch conveyers and locate them on either or both sides of the main conveyer.

The main conveyer A comprises a trough or frame 1 having the upper run of an endless conveyer belt 2 located above the bottom thereof and supported at suitable intervals by idle rollers 3.

Rollers 4 and 5 support the belt 2 at the ends of the trough and the roller 4, constitutes a driving roller and has a drive pulley 6 secured to turn therewith. The other roller 5 is supported by bearing blocks 7 adjustably mounted in channel guides 8 and adjusted by means of set screws 9 to take up slack in the belt and operate as a belt tightener.

A longitudinal shaft 10 is mounted in hangers 11 secured to the bottom of the main conveyer trough and is provided with a pulley 12 to which power is transmitted from any desired source.

The branch conveyers B and C each comprise box-like troughs 13 having the upper runs of endless belts 14 and 15 respectively mounted therein and supported on rolls 16 and 17 at their respective ends. The inner rolls 16 constitute driving rolls and are secured on shafts 18 projecting from the sides of the conveyers B and C and having gear wheels 19 fixed thereon.

The idle rolls 17 are supported in slide brackets 20 mounted in guides 21 and adjusted by set screws 22 to take up slack in the belts 14 and 15.

The boxes or troughs of the branch conveyers B and C are provided at their inner ends with forked arms 23 receiving the shaft 10 and pivotally secured thereon by removable pins 25, so that the branch conveyers can be conveniently attached and detached, and moved from place to place.

Bails 26 are provided at the outer ends of the branch conveyers for the attachment of the ropes which raise and lower the conveyer as will be readily understood.

Drive gears 27 are loosely mounted on the shaft 10 and mesh with the gear wheels 19. Clutches 28 on the shaft 10 are constructed to lock the gears 27 and shaft 10 together and these clutches are operated by clutch levers 29, said levers pivotally supported between their ends on brackets 30 depending from the main conveyer A, and extend transversely below the main conveyer.

The main conveyer A is provided in its side wall with hinged gates 31 which are adapted when open to extend diagonally across the main conveyer and guide the material onto the branch conveyer, as shown at the left of Figure 1.

As the gates and operating mechanism of both branch conveyers are precisely alike, the description hereinafter of one will apply alike to both.

A vertical crank shaft 32 is mounted in a suitable bracket 33 on one side of the main conveyer, and is provided at its lower end with oppositely positioned crank arms 34, one of which is connected by a link 35' with the end of lever 29.

A gate operating link 35 is pivotally connected as shown at 36 to the upper edge of the gate 31, and at one end is connected with the conveyer box by means of a coiled spring 37 which by reason of the angular position of parts operates to hold the gate in both open and closed position.

This link 35 extends over the top of the main conveyer A and is connected to a crank arm 38 on the upper end of shaft 33 so that the gate and clutch mechanism are simultaneously operated.

The main conveyer A is also preferably provided with deflecting shields 39 at their outlets to deflect the material onto the branch conveyers.

The operation is as follows:

Figure 1 illustrates the parts in position to discharge from the main conveyer A into conveyer C, conveyer B being shut off.

To open the gate 31 of conveyer B, the crank shaft 33 is turned and through the medium of the crank arm 38 and link 35 will draw the gate 31 to open position which is at an angle across the main conveyer. At the same time, the lever 29 will be swung on its pivot through the medium of crank arm 34 and link 35' to shift clutch 28 and lock the gear wheel 27 to the shaft 10 and transmitting motion to gear wheel 19 to drive the belt 14 of branch conveyer B.

It is of course to be understood that when the gate to conveyer B is opened, the gate to conveyer C is closed, and vice versa.

Various slight changes might be made in the general form of the parts described without departing from my invention, and hence I do not limit myself to the precise details set forth, but consider myself at liberty to make such slight changes and alterations as fairly fall within the spirit and scope of the appended claims.

I claim:

1. The combination with a main conveyer, a gate in the main conveyer adapted when open to direct material onto the branch conveyer, operating means for the branch conveyer, a clutch controlling said operating means, and mechanism for moving the gate and the clutch simultaneously.

2. The combination with a main conveyer, a gate in the main conveyer adapted when open to direct material onto the branch conveyer, a clutch controlling said operating means, a crank shaft, a link connecting the crank shaft and gate, a clutch lever, and a link connecting the clutch lever and crank shaft.

3. The combination with a main conveyer, a gate in the main conveyer adapted when open to direct material onto the branch conveyer, operating means for the branch conveyer, a clutch controlling said operating means, mechanism for moving the gate and the clutch simultaneously and a spring engaging the gate and operating to elastically hold the gate in both open and closed position.

4. The combination with a main conveyer, a gate in the main conveyer adapted when open to direct material onto the branch conveyer, a clutch controlling said operating means, a crank shaft, a link connecting the crank shaft and gate, a clutch lever, and a link connecting the clutch lever and crank shaft, and a spring engaging the gate and operating to elastically hold the gate in both open and closed position.

5. The combination with a main conveyer, having outlets in its sides, gates controlling said outlets, of a drive shaft supported below the main conveyer, branch conveyers, forked arms on the branch conveyers pivotally secured to the shaft, intermeshing gears on the branch conveyer and the shaft and clutches locking the shaft gears to the shaft.

6. The combination with a main conveyer, having outlets in its sides, gates controlling said outlets, of a drive shaft supported below the main conveyer, branch conveyers, forked arms on the branch conveyers pivotally secured to the shaft, intermeshing gears on the branch conveyer and the shaft and means controlling the operation of the gates and the gears.

7. The combination with a main conveyer, having outlets in its sides, gates controlling said outlets, of a drive shaft supported below the main conveyer, branch conveyers, forked arms on the branch conveyers pivotally secured to the shaft, intermeshing gears on the branch conveyers and the shaft, clutches locking the shaft gears to the shaft, and means simultaneously operating the gates and the clutches.

CHRISTIAN FREDRICKSON.